March 15, 1966  B. E. WILLIAMS  3,240,611
PROCESS FOR MAKING PLASTIC-COATED CONTAINERS AND PROCESS
OF PACKAGING, UTILIZING SAID CONTAINERS
Filed Aug. 29, 1962  5 Sheets-Sheet 1
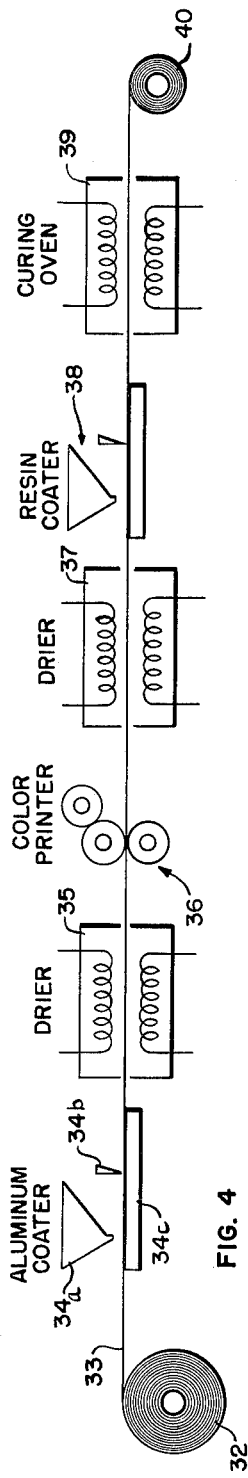
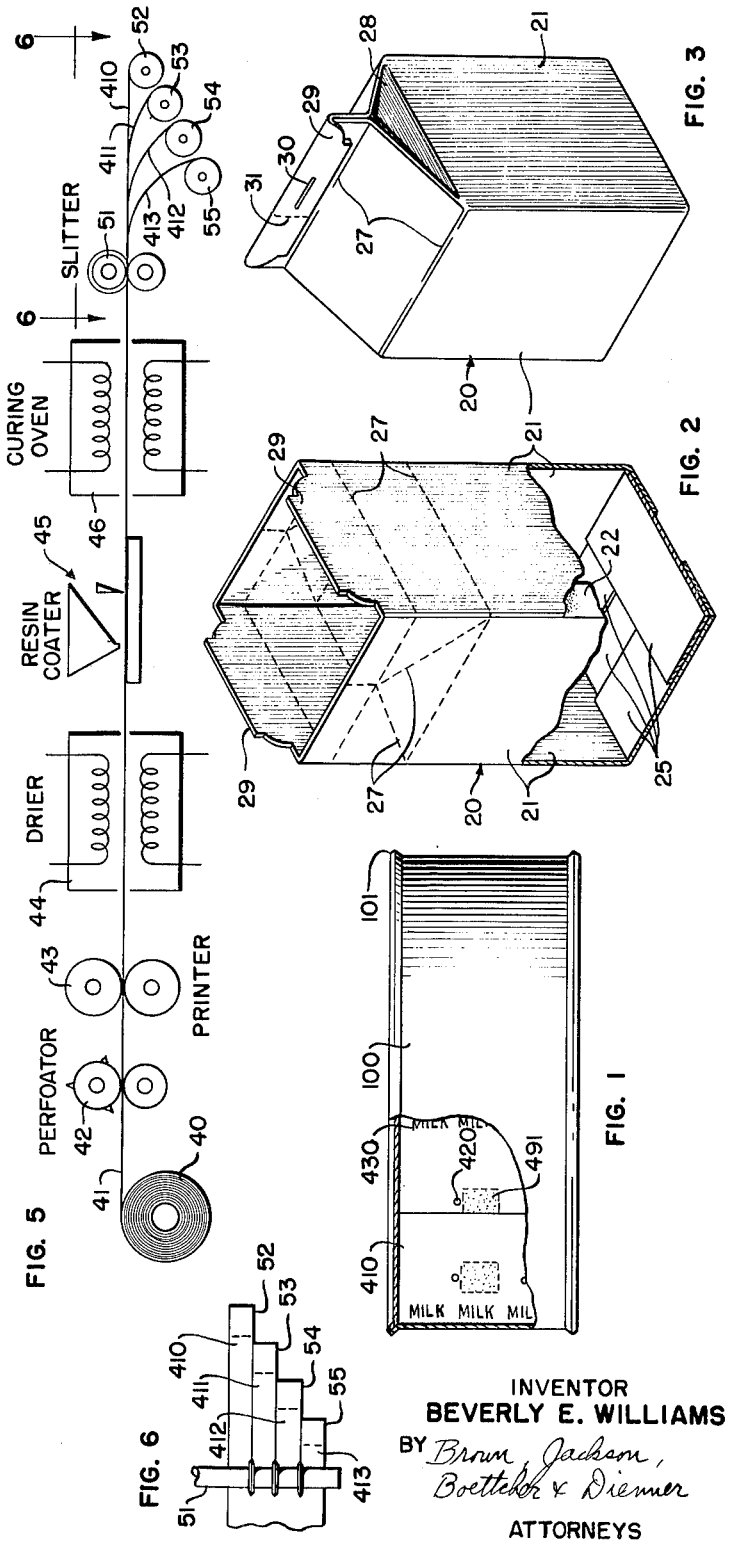
INVENTOR
BEVERLY E. WILLIAMS
BY Brown, Jackson,
Boettcher & Diemer
ATTORNEYS

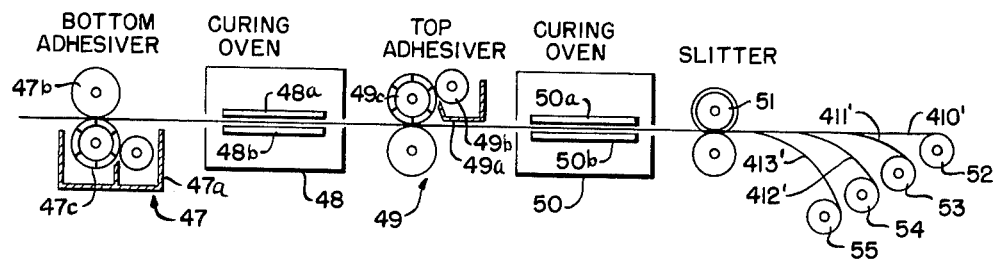
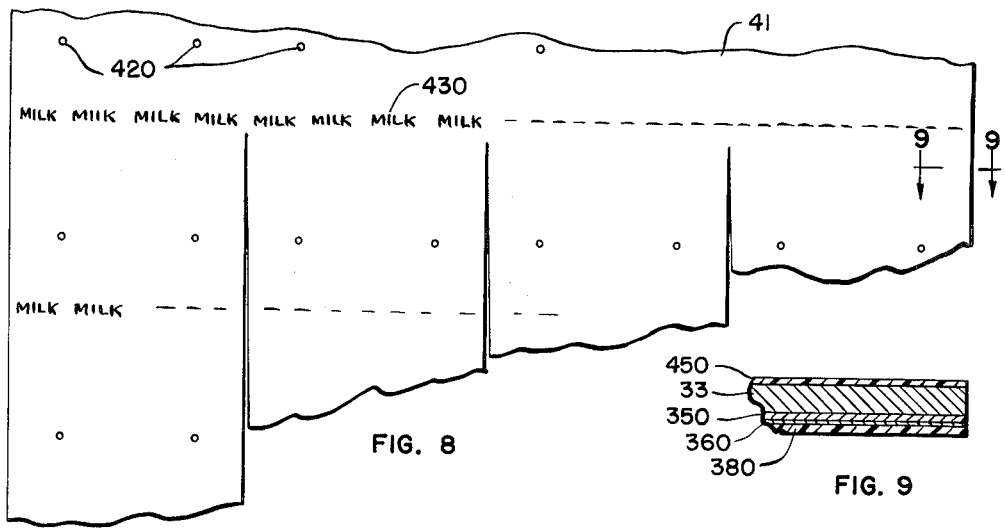
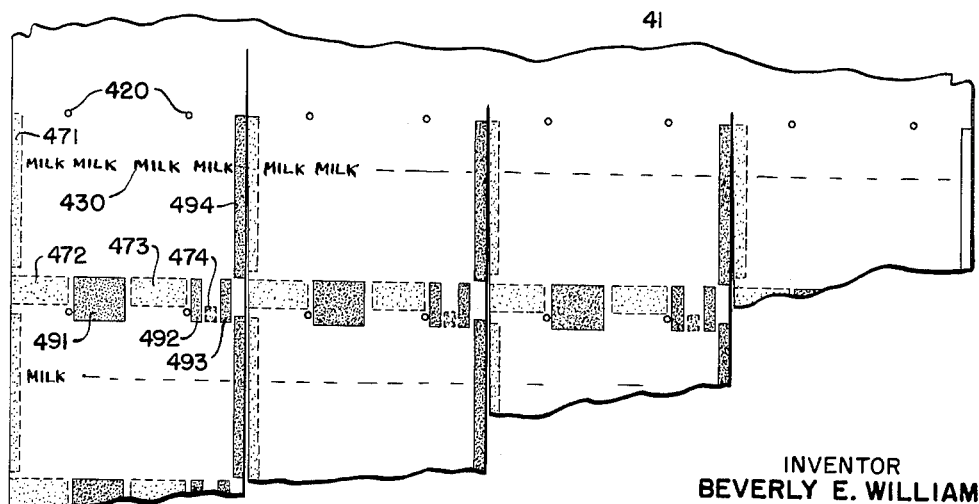
INVENTOR
BEVERLY E. WILLIAMS

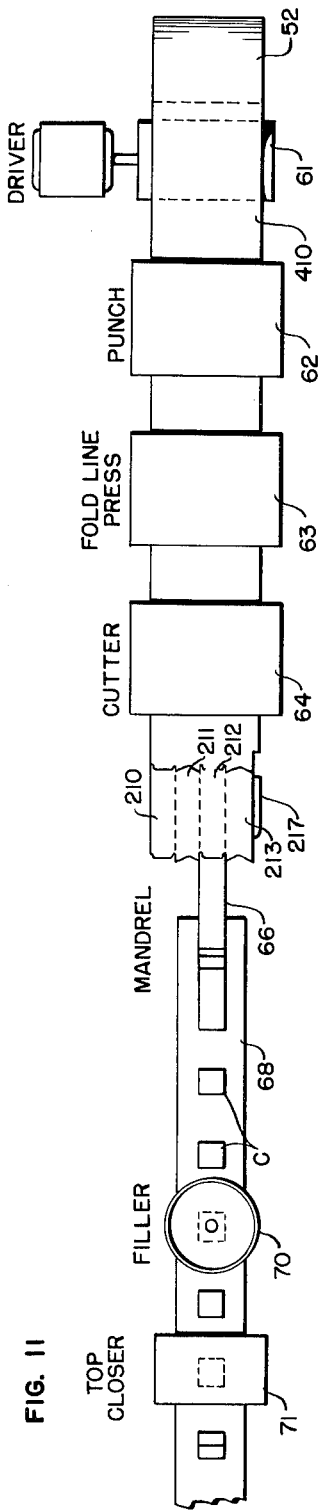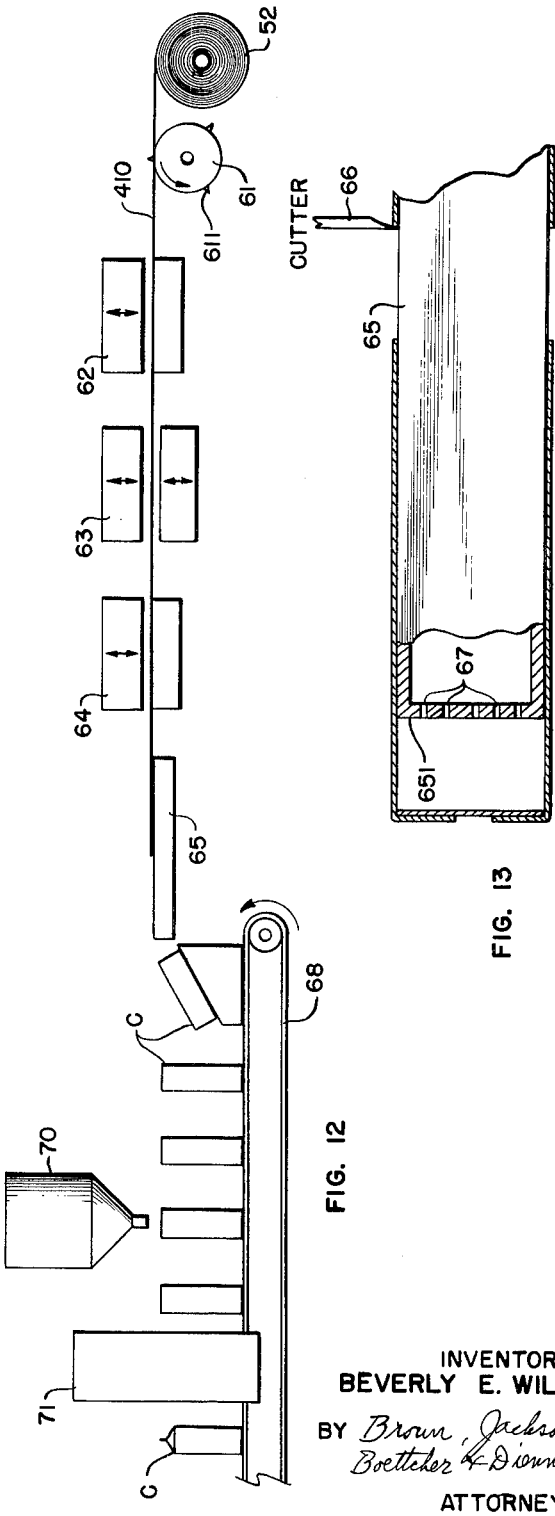

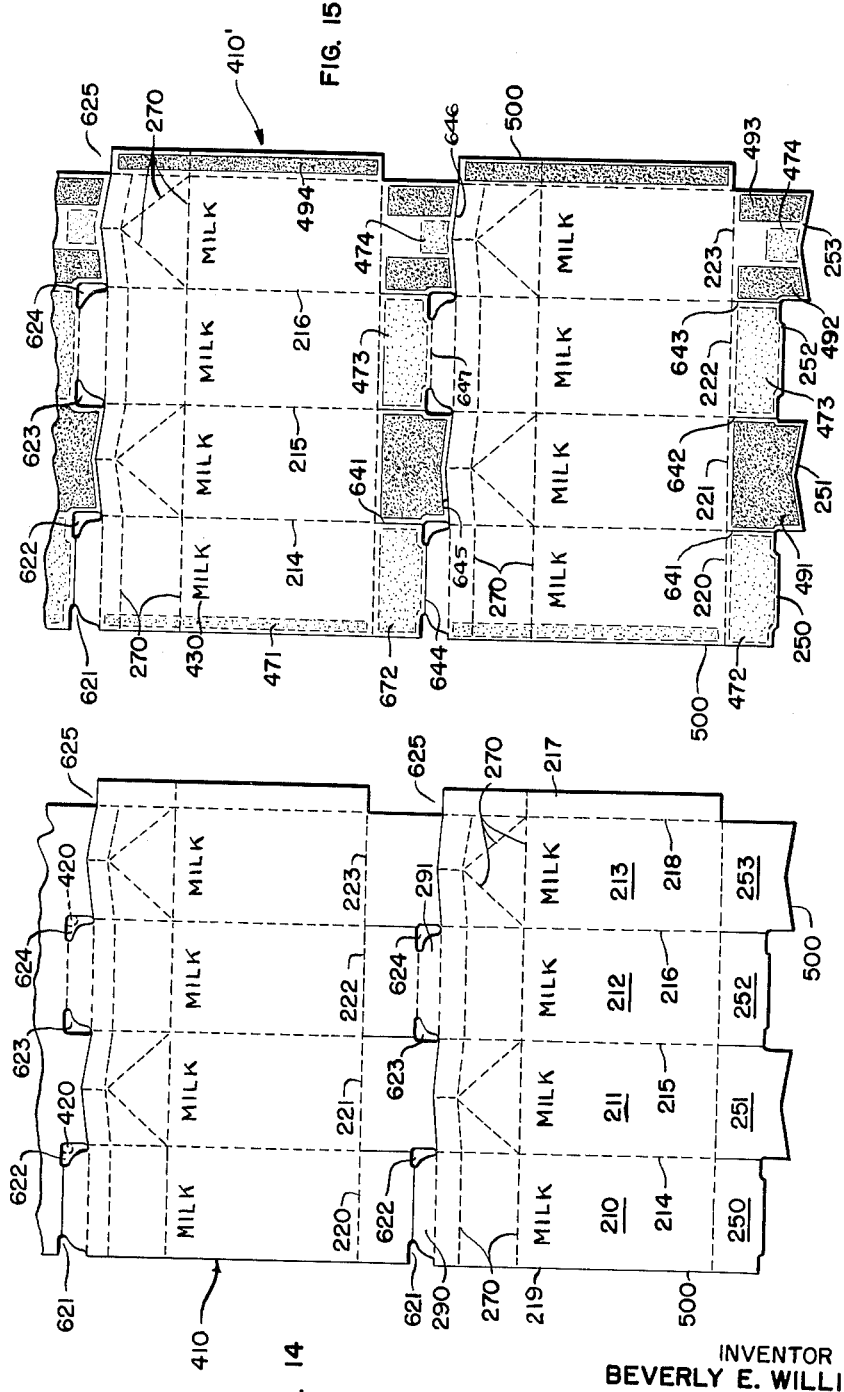

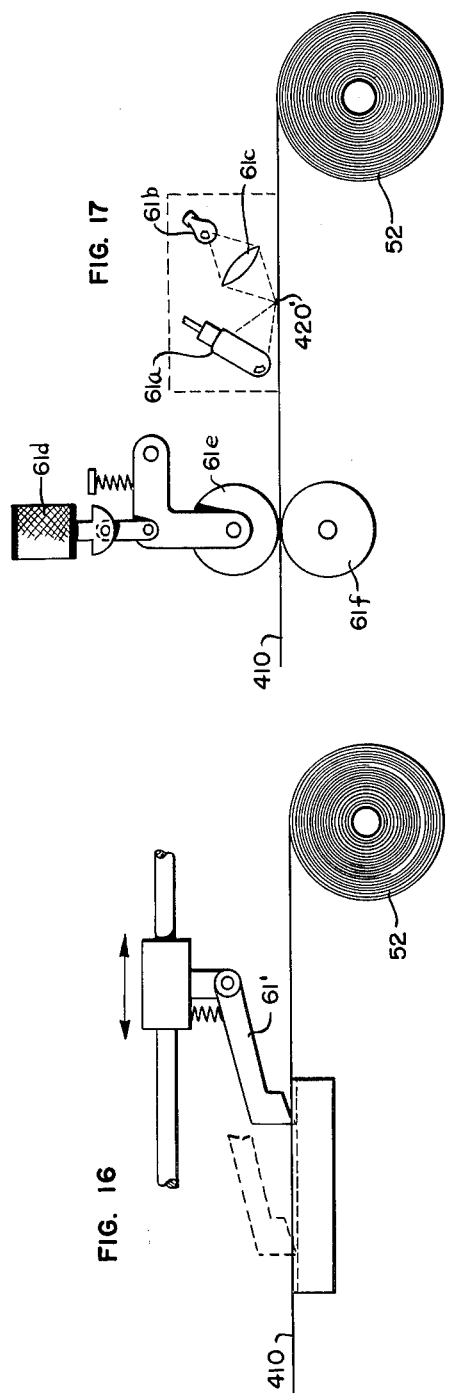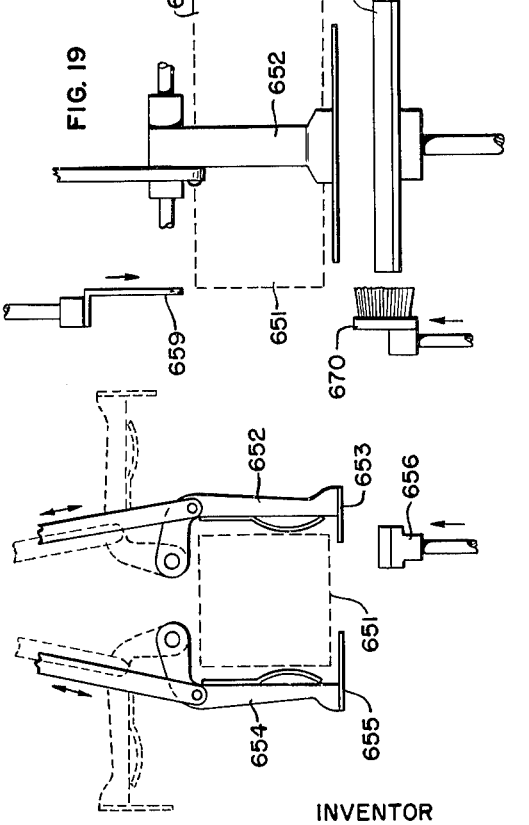

United States Patent Office
3,240,611
Patented Mar. 15, 1966

3,240,611
PROCESS FOR MAKING PLASTIC-COATED CONTAINERS AND PROCESS OF PACKAGING, UTILIZING SAID CONTAINERS
Beverly E. Williams, 716 N. La Grange Road,
La Grange Park, Ill.
Filed Aug. 29, 1962, Ser. No. 220,181
23 Claims. (Cl. 99—181)

The present application is a continuation-in-part of my copending application Serial No. 750,027, filed July 21, 1958, now United States Patent 3,055,152, issued September 25, 1962.

This invention relates to the manufacture of cartons or containers from metals, natural or synthetic materials such as paper, cardboard, pressed fiber board, plastics, and the like. Although not limited thereto, the herein described method and apparatus is particularly concerned with the manufacture of more or less rectangular cartons that are useful as containers for milk as well as other dairy products, orange juice and many other liquids and semi-solids.

Particularly in the dairy industry, the concept of packaging fluids such as milk or cream for consumer distribution in sealed paper containers that used once can be then thrown away has been recognized as having many advantages. There is no problem of glass breakage, nor of cleaning and sterilizing returned containers for reuse. For these and other advantages gained thereby, paper containers have to a considerable extent supplanted the older use of glass bottles in this industry.

However the conversion has not been made without problems. Because each carton was to be used only once, this meant that the dairies each have to be provided with a continuous supply of cartons at a rate equal to their daily output of packaged products. At the present time, the cartons most popular in the dairy trade are of rectangular or square shape because they can be stored efficiently in containers for delivery to retail outlets and in refrigerators. These rectangular cartons are either set up complete, waxed and ready for filling by the carton manufacturer or they are semi-finished by the carton manufacturer and sold in knocked-down form. These knocked-down cartons have their side seam glued and are sold unwaxed. They are then set up and waxed at the dairy as needed.

The completely finished cartons comprise a considerable amount of bulk, the greater part, by far, of which is air so that a large amount of shipping and storage space is required. Obviously, the number of cartons that may be economically stored at a dairy is limited and, therefore, it is essential that a source of constant supply be close by to insure uninterrupted and regular delivery.

Knocked-down cartons require much less shipping and storage space but they do require a relatively large number of shipping containers because comparatively few can be packed to a container for convenient handling at the dairy. Furthermore, the labor required at the dairy to unpack these cartons and feed them into the magazine of the setting-up machines is quite considerable.

For reasons of economy and sanitation, it is neither convenient or desirable for the individual dairies to try to manufacture the paper cartons from the raw paper stock itself. The operations of printing, gluing and otherwise fabricating the cartons provide numerous problems with which the average dairy manager has neither the time, skill or desire to cope. The needed equipment to carry out these operations is quite considerable and to be economically feasible needs to be conducted on a much larger scale than that which is necessary to satisfy the needs of the usual dairy operator.

The raw paper stock is itself easily wetted. To improve its resistance, conventionally a coating of paraffin or other wax is applied to the interior surfaces of the set-up cartons and usually also to their exterior. However, this has not proved to be entirely satisfactory. The wax is not easily applied uniformly and often presents a coarse, semi-opaque, unsightly texture in appearance which is distasteful to many people. Often flakes of the wax will break off and mix with the milk, for example. This is also a source of annoyance. More recently tests of such waxes indicate that they may also be carcinogenous, at least to a limited extent.

Milk and various other products are conventionally stored in refrigerated show cases illuminated by fluorescent light. In actual tests, it has been found that ordinary paper board has little effect on the transmission of the ultraviolet portion of the radiations emitted by such tubes. These tests revealed that milk packaged in conventional paper cartons, when exposed to light particularly from fluorescent tubes, quickly loses an appreciable quantity of its ascorbic acid content. An 8 to 50% loss of riboflavin (vitamin $B_2$) also was found to occur during transport of milk to consumers under ordinary refrigerated delivery conditions. This was apparently due to its exposure to the ultraviolet radiation portion of ordinary sunlight. In many instances a noticeable loss in taste of the milk also accompanied the loss in vitamin C.

In accordance with the present invention, however, it was found that such losses could be considerably reduced and the raw paper stock rendered more resistant to wetting, as well as having a more satisfactory surface texture and finish than the wax-coated stock if the stock were tinted with a dark red or brown vegetable coloring material or other approved edible dye. This dye would be placed on one or both sides of the paper stock or synthetic sheet stock and covered with a thin continuous film of a protective non-toxic, essentially inert thermoplastic resin, such as polyvinyl chloride, polyethylene and like resins of relatively high molecular weight which strongly adhere to the sheet stock. The following chart is indicative of the improvement by way of reduced losses of ascorbic acid content of milk which were obtained by tinting the sheet stock from which the cartons containing milk were formed. In the experiment, milk was packaged in cartons tinted light blue, dark red, brown and also in untinted cartons. The cartons of milk were stored under fluorescent lights at three different intensities and for intervals of three and six hours. The storage temperature was held approximately 10° C. The vitamin C content of the milk was measured at the beginning of the experiment and its starting content is to be considered as 100%. The results were as follows:

| Storage Time in Hours | Tint of Carton | Left Over Content of Ascorbic Acid With a Light Intensity of— | | |
|---|---|---|---|---|
| | | 6,600 lux | 10,000 lux | 90,000 lux |
| 3 | Untinted | (¹) | 50.6 | 4.8 |
| 3 | Light Blue | 67.7 | 29.1 | 5.3 |
| 3 | Dark Red | 89.1 | 83.7 | 13.8 |
| 3 | Brown | 93.3 | 88.0 | 40.3 |
| 6 | Untinted | (¹) | 18.8 | 3.5 |
| 6 | Light Blue | 47.0 | 4.4 | 4.4 |
| 6 | Dark Red | 81.8 | 80.1 | 3.5 |
| 6 | Brown | 89.5 | 76.1 | 4.0 |

¹ No analysis.

Optionally, the colorant can be added to the coating. Also, light penetration can be combatted by a coating of aluminum or other reflective metal disposed between the plastic coating and the paper board surface. This reflective metal has been found effective, whether applied to the interior or exterior of the carton, to keep out all harmful radiations ranging from the ultraviolet through the visible to the infrared radiations. The combination of an underlayer of aluminum and a dark red or brown tinted resin coating has been found to have particularly excellent light inhibiting qualities. Instead of tinting the resin coating, the colorant could be supplied to the aluminum layer so that the milk or other content of the carton can contact only the overlying clear protective resin film.

Thus an important object of the present invention is to provide novel and improved coated stock which will be useful for the storage of various materials such as orange juice, milk, various dairy products and the like, and includes a method of coating sheet stock to render it useful for such purposes.

Another important object of the invention is to provide coated sheet stock that will be both resistant to attack by various liquids and breakdown by wetting.

Still another object of the invention is to provide a method of coating sheet stock as well as the coated product of said method which will be useful to package milk and other products containing riboflavin and/or ascorbic acid which is subject to destruction by sunlight and/or fluorescent light.

Still another object of the invention is to provide new and novel means and method of treating sheet stock from which cartons for the package of milk and other products are to be found, and which will be both relatively non-toxic and inert in its effects on said package product and will also protect said product from destruction of its vitamin content as when subjected to sunlight and/or stored in a refrigerated show case illuminuated by fluorescent and/or incandescent light.

Another and important object of the present invention is to provide improved means and methods of manufacturing plastic or plastic-coated cartons of the aforesaid type which will largely overcome the difficulties of the previously used procedures and will provide a completed carton at the lowest possible unit cost.

Another object of the invention is to provide a method for the continuous and high speed manufacture of fiberglass, plastic and plastic-coated cartons and/or blanks therefor that may be economically manufactured at one location, inexpensively transported to a carton assembler such as at a dairy, and there conveniently completed in a non-hazardous, simple and practical manner as required.

Another object of the invention is to provide as an article of manufacture or commerce, semi-finished plastic-coated cartons that may be economically shipped to the user and economically stored in a minimum of space.

Another object of the invention is to provide a method of manufacturing semi-finished plastic-coated cartons whereby the same may be conveniently and economically finished by a user in a manner that will not disrupt or otherwise interfere with his normal routine in preparing and packaging his milk fluid product.

Still another and more specific object of the invention is to provide a novel container for dairy products and the like that may be constructed of paper, aluminum, plastic and other suitable materials and which is coated to provide resistance to destruction of its vitamin $B_2$ and C content, as for example when stored in a fluorescent-lighted show case or is exposed to sunlight for prolonged intervals.

With these and other objects of the invention in mind, I propose that the dairies or other packagers be supplied with rolls of tightly coiled light weight pliable carton-forming materials, such as paper, cardboard, pressed fiber board, compressed foam rubber, natural and synthetic, compressed expanded vinyls and the like which have been previously printed and coated with an ultraviolet light inhibitor and/or plastic coating on one or both sides thereof and further provided with guide or aligning means which may be in the form of holes following a preconceived pattern, these rolls to be unwound at the dairy as needed and the web therefrom fed through appropriate apparatus for folding into cartons, which are severed from the roll as they are formed immediately ahead of the container filling and sealing operations in a continuous process. Because the only thing shipped as well as stored by the packager are the tightly-coiled rolls, the problems of bulk in shipping and storage largely disappear.

Furthermore, I contemplate a new design or layout of the cartons in the rolls such that substantially all the web is used and whereby the problem of waste and its disposal is kept at a minimum. The operations of folding and severing required of the user of such rolls are ones that can be conveniently conducted at the dairy and can be conveniently synchronized into the filling and sealing operations now conducted at the dairy so that the process can start with unwinding the rolls and continue uninterrupted through filling and sealing of the milk filled cartons. Of consequence, not only does the invention, as hereinafter described, overcome the problems and expense of shipping and storing completed or partially completed cartons such as previously used, but the tightly coiled rolls can be easily kept vermin-proof and clean until used. Also, since cartons can be conveniently formed therefrom in only such numbers as are required for a filling operation, much higher standards of sanitation can be maintained.

In one form of the invention, I take advantage of the thermoplastic character of the resin coating applied to the carton material stock by applying heat to the portions of the sheet stock which are lapped in the carton forming operation so that upon cooling they will be strongly bonded into the carton form.

Alternatively, the manufacturer will adhesively coat these portions of each blank in the roll of sheet stock which are lapped in the carton setting-up operation. In this embodiment the protective coating may be composed of a thermosetting as well as a thermoplastic resin. The adhesive may be applied over the plastic coating in said selected areas or the plastic coating may be applied only to the areas which are not lapped in the carton set-up operation. In this alternative form of the invention the adhesive which is applied by the manufacturer will be of the type capable after application and evaporation of the solvent of bonding on contact to similarly coated areas of the sheet stock but not to the remainder of the stock. This has the advantage that in the carton set-up operation conducted at the dairy no provision has to be made either to apply the adhesive or to allow it to set. Rather, the mere act of folding and bringing the lapped portions together suffices to obtain the required bonding effect.

The adhesive is applied to both sides of the carton blanks in the roll, that is to those areas or patches on the surfaces of the end lap forming portions and side seam forming portions which come into contact. However, there is no problem from the stock sticking in the roll because a further feature of the invention is that the patches of adhesive are arranged in parallel lanes which extend lengthwise of the roll stock, the bonds of which are so controlled that they do not encroach into the bounds of an adjacent parallel lane of adhesive patches although disposed on the opposite side of the sheet. By this simple expedient, assurance is had that no two areas of adhesive will come into contact with each other in the roll and the same can be freely rolled and unrolled.

The aforesaid consitutes other features, objects and/or advantages of the invention. Still other objects, features and advantages of the invention will be apparent, or will become so, from the more specific description of the invention which now follows.

Referring now to the drawings in which like parts are identified by like reference numerals:

FIGURE 1 is a side elevational view of a roll of plastic-coated carton blanks formed in accordance with the invention and packaged ready for shipment and/or storage, a portion of the wrapper being cut away to expose the roll contained therein;

FIGURE 2 is a partially fragmented perspective view of a set up carton from the roll of FIGURE 1 and illustrated with its bottom end closed;

FIGURE 3 is a perspective view of the carton with its top end also closed;

FIGURE 4 illustrates in diagrammatic form the steps followed to complete one side of the roll of carton blanks illustrated in FIGURE 1;

FIGURE 5 illustrates in diagrammatic form the steps followed to complete the other side of the roll;

FIGURE 6 is a sectional view taken along lines 6—6 of FIGURE 5 looking in the direction indicated by the arrows;

FIGURE 7 illustrates a sequence of steps comprising a modification of the sequence of steps comprising FIGURE 5;

FIGURE 8 is a fragment of a web of sheet material fabricated according to the sequence of steps illustrated in FIGURES 4 and 5;

FIGURE 9 is a sectional view taken through said sheet along lines 9—9;

FIGURE 10 is a fragmented web of sheet material fabricated according to the sequence of steps illustrated in FIGURES 4 and 7;

FIGURE 11 illustrates in diagrammatic form the steps constituting a further stage of the process and in which the rolled strand of perforated and printed plastic-coated carton form blanks is set up, filled and the tops of the filled cartons closed to complete the packaging process;

FIGURE 12 is a side elevational view of the steps as diagrammatically illustrated in FIGURE 11;

FIGURE 13 is an enlarged fragmentary view of the material used in one step of the process and illustrates a carton being blown off for conveyance to be filled;

FIGURE 14 is a fragment of a web from the roll of FIGURE 1 that has been punched, scored with fold lines and the terminal blank partially severed from the remainder of the web ready for folding about the mandrel;

FIGURE 15 is a view generally similar to FIGURE 14 and illustrates a fragment of a web which in its first stage of manufacture was processed according to FIGURES 4 and 7 (see FIGURE 10);

FIGURE 16 shows an alternate arrangement for controlled intermediate feeding of the roll of carton blanks through the steps illustrated by FIGURES 11 and 12;

FIGURE 17 shows a further arrangement utilizing a photocell wherein the index means on the roll of carton forming blanks comprise light sensitive areas; and FIGURES 18, 19 and 20 illustrate in diagrammatic form folding wings by means of which the end blank of the roll is folded about the mandrel (FIGURE 13) into a one end closed carton.

Referring first to FIGURES 2 and 3, in one form of the invention a carton 20 is formed of sheet material such as lightweight pliable cardboard, pressed wood fibers, pressed non-woven cloth or vegetable fibers, bleached sulphate board, compressed foam rubber, natural or synthetic, compressed expanded vinyls and the like which are coated or impregnated on one or both sides with a suitable thermoplastic or thermosetting resin and folded to have a generally rectangular shape with an open top and a closed flat bottom and so that it may stand erect for the filling operation. The sheet material may also comprise plastic-coated pliable metal sheets such as aluminum foil, as well as laminated plies of paper and woven or unwoven cloth, or sheets of thermosetting or thermoplastic material. Referring to FIGURE 2, one of the four side panels 21 which comprises the carton 20 is shown provided with an integral attachment tab 22 which extends lengthwise thereof and is secured to the marginal portion 24 of the adjacent side panel. Each of said side panels 21 further has a lower end flap 25 formed integrally therewith and which end flaps are folded together into lapping relation and secured together to close the bottom end. The upper end of the side panels 21 are shown scored with fold lines at 27 so that when filled with milk, orange juice or other fluid, the open top may be sealed by folding the upper portion of said panels 21 inwardly along said fold lines 27 to produce the gabled top effect 28 illustrated in FIGURE 3. Two oppositely disposed panels 21 further have flaps 29, one of which is folded in and the other over and stapled as at 30. Conventionally, the gabled top 28 is also provided with a suitable line of perforations 31 by which an opening may be formed therein to permit dispensing of the contents. Any other arrangement for closing and sealing the open top of the container and/or for dispensing the fluid contents from said sealed top may be utilized.

In order to avoid the problems of bulk in shipping and storage which resulted from the previous practice of having the entire operation conducted by the carton manufacturer at a location remote from where the cartons are to be used, the present invention proposes to divide the manufacturing operation into two stages whereby the dairyman or other user of cartons is supplied with long lengths or strands of end-connected carton blanks left flat together and which can be shipped and stored in tightly coiled rolls which take up a minimum of space. The strands of carton blanks are however sufficiently processed that the dairyman can set up cartons from the furnished strands of connected blanks by threading the strand through a carton folding press as it is unwound, and be automatically supplied from said roll with cartons ready for filling at any desired rate and preferably at a rate which can be synchronized into the filling and sealing operations practiced at the dairy so that there are no problems of storing or maintaining empty cartons for any period of time. Such a processed strand is illustrated at 410 in FIGURE 1 tightly coiled in roll form and encased in a protective wrapper 100 and heat sealed or otherwise secured at its periphery 101 to provide a strong, waterproof and vermin-proof sheath therefor. Although any suitable material may be used to form wrapper 100, I prefer to use a synthetic sheet material or a polyvinyl chloride coated paper or one comprising a first lamina of cloth, woven or non-woven, a second lamina of aluminum and an inner lamina of thin plastic material. I might also use an asphalt coated or laminated paper or flexible, pliable, formable sheets of metal, such as aluminum foil or foil laminates. The desired seal may be obtained by heat sealing at 101 where a plastic coated wrapper is utilized or by using an appropriate adhesive or gummed label.

Referring now to FIGURE 14, a completed blank ready for folding about a mandrel in a step to be herein described is shown as comprising a plurality of end-to-end joined blanks in a strand each having four side panels 210, 211, 212, 213 which extend lengthwise of the strand 410 and are separated by fold lines 214, 215 and 216. Side panel 213 also has a side or attachment tab 217 extending lengthwise of one side and separated therefrom by fold line 218. When the side panels are folded into a rectangular shape along said fold lines, tab 217 is lapped beneath marginal portion 219 of side panel 210 and secured thereto. On the forward or leading end, each of panels 210, 211, 212 and 213 further have integrally formed end flaps 250, 251, 252 and 253, respectively, which are lapped together and secured to form the closed bottom end of the carton. The blank also includes fold lines indicated generally at 270, and side panels 210 and 212 further include flap portions 290 and 291 which correspond to the flaps 29 of the carton illustrated in FIGURE 1. As seen in FIGURE 14, the layout of the carton blanks is such there is little or no waste but essentially all of the strand 410 is required to form the blanks. The only actual waste is represented by punch outs 621, 622, 623, 624 and 625.

Returning now to FIGURES 4, 5 and 6, 32 represents a tightly wound roll of paperboard or other carton-forming sheet material from which a web 33 is unrolled and processed through the several apparatus diagrammatically illustrated. Said web 33 may have a width accommodating any convenient number of carton forming blanks and in the aforesaid FIGURES 4, 5 and 6 (also see FIGURES 8 and 10) is shown wide enough to accommodate four lengths or strands of carton forming blanks, one of which is illustrated at 410 in FIGURE 14. Referring now first to FIGURE 4, in the preferred form of the invention wide web 33 as it is unrolled from roll 32 is passed through means 34 where a coating or layer of reflective metal, such as aluminum, is applied to one side of the web uniformly across its width. The aluminum or other metal may be applied as a foil or it may comprise a powder or flakes which have been treated with a leafing agent such as stearic acid and suspended in an appropriate vehicle 34a represents means by which a controlled amount of the metal flake containing vehicle is flowed onto the exposed upper surface of web 33; 34b represents a doctor blade or other device for leveling the applied suspension and 34c is a support or bed over which the web moves and supports the web during the coating operation. 35 represents a speed-dry tunnel or other arrangement for evaporating the solvent vehicle and from which the web exits into an appropriate color printing device 36. There the aluminum or metal layer 350 is coated with a pigment containing lacquer, dye or other colorant 360. The colorant may be applied as by the illustrated offset roller method, by spraying, by use of doctor blade technique or any other convenient manner. The selected dye or colorant may be an edible vegetable coloring material or any other colorant approved by the Food and Drug Administration or Meat Inspection Division of the United States Department of Agriculture, and found to be non-toxic and otherwise safe for packaging food products. The selected colorant should be one which will produce a dark red, brown or other color capable of absorbing the ultraviolet radiations from sunlight and/or fluorescent light.

After passing through drier 37 the thin metal coated and colored web is covered with a continuous protective layer 380 of clear resin, such as polyvinyl chloride, polyethylene or other resin which is non-toxic and inert to the effects of milk or other product to be packaged in the subsequently formed cartons. The resin selected should also be one which when applied as thin film to this coated paper will strongly adhere thereto and will remain flexible without rupturing when folded as in the subsequent carton assembly steps. In one form of the invention it should also have a softening temperature low enough that it can be usefully heated during the folding steps and cooled to effect a strong liquid-tight bond between the lapped portions of the carton. The aforenamed polyethylene and polyvinyl chloride have these particular qualities. They are also conveniently available either as aqueous emulsions or as aquasols. Other resins which have been approved for use in packaging food include Bisphenol-formaldehyde, certain substituted phenol formaldehydes, phenol formaldehyde, urea formaldehyde, bisphenol-epichlorin and esters thereof, maleic anhydride, rosin ester, esterified Congo resin, esterified rosin, polyvinyl chloride and acetate, cellulose acetate, butyrate, polystyrene, polyvinyl butyral, petroleum hydrocarbon, vinylidine chloride, cellulose acetate, regenerated cellulose, butadiene-acrylonitrile copolymer, methyl and ethyl acetate, ethyl cellulose, rubber hydrochloride, ethylene terephthalate, ethyl isophthalate, butadiene-styrene copolymer, butadiene-acrylonitrile-styrene copolymer, terephathalic acid-ethylene glycol copolymer. Conventionally to obtain the described properties, such resins will be combined with an appropriate plasticizer. Examples of suitable plasticizers include acetyl tributyl citrate, acetyl triethyl citrate, butyl stearate, butyl phthalyl, butyl glycollate, p-tertiary butyl phenyl salicylate, dibutyl sebacate, diisobutyl adipate, di-2-ethyl hexyl phthalate (for foods of high water content only), di-iso-octyl phthalate (for foods of high water content only), diethyl phthalate, 2-ethyl hexyl diphenyl phosphate, ethyl phthalyl ethyl glycollate, glyceryl monooleate, glycerin triacelate, monoisopropyl citrate, stearyl citrate, paraplex G-60, paraplex G-62, triethyl citrate and 3-(2-Xenoxyl)-1,2-epoxipropene. It is to be understood that any of the above and other resins and plasticizers found to be acceptable for food packaging and having the necessary compatability and other indicated properties may comprise the resin coating 380.

The coating may be applied in any suitable manner. For example, it may be prepared as a separate film and laminated to the web 33 under heat and pressure, or it may be applied thereto from a solution, suspension or emulsion of the resin. In the latter instance it may be applied either by spraying, roller coating, by means of a doctor blade or other conventional technique, as are well known to those skilled in the art. Once the coating of resin has been applied, it may be cured as by passing the web through a temperature controlled oven 39 or other appropriate means. At this stage, the web may be rerolled or the process may be continued by processing the other side of the web.

Referring now to FIGURE 5, assuming the processing of the two sides to comprise separate stages, a web 41 comprising a one side coated web as obtained by the steps of FIGURE 3 is unrolled from roll 40 and is initially run through a rotary printing press equipped with a perforating station as at 42, one or more printing stations 43, and a tunnel 44. Such a press may be of any conventional type, one such being identified as an Aniline press manufactured by the Kidder Company, Dover, New Hampshire. Perforating station 42 is preferably located ahead of the printing station 43 and serves to punch parallel rows of indexing holes 420 (see FIGURE 8) in the web 41 which serve as means to properly register the web 41 with apparatus used in subsequent operations thereon. The indexing holes 420, as seen in FIGURE 8, are preferably arranged in parallel lanes and spaced apart in each lane the length of a carton blank and are located adjacent fold lines 214 and 216 (FIGURE 14) so as to fall in potential waste areas indicated at 622 and 624 about the bottom end flap forming portions of said web and which are subsequently removed. In the alternative, they may be located in any two of the end flap forming portions 250–253, but in portions thereof such that in the subsequent folding and flap securing operations, they will be covered and sealed by an overlapping flap portion. Said registration holes 420 not only serve to hold the web 41 in a predetermined alignment as it passes through the subsequent printing and drying steps which comprise the first stage in the inventive process, but they also serve to properly locate the strand of cartons as it is later unwound from the roll and fed through the setting-up machine (FIGURES 11 and 12). If desired, instead of holes, the indexing means 420 might comprise light sensitive marks formed on the web 41 for use in conjunction with a photocell provided on the carton set-up machine. If light sensitive means are employed in place of holes or perforations, considerable more latitude of location for the indexing means may be had. However, they will nevertheless be located at intervals equal to a length of a carton blank.

The perforated or indexed web 41 as it exists from station 42 is next passed through printing station 43 where identifying legends and/or other advertising material, such as illustrated at 430 (see FIGURE 8), is printed and then dried in drying tunnel 44. Athough a single printing station 43 and subsequent dryer 44 are illustrated in FIGURE 5, it will of course be understood that printed material 430 may be provided in more than one color, and in which circumstance the number of printing stations and dryers will of course be multiplied as in accordance with well known conventional procedures.

After printing, web 41 is coated at 45 with a protective clear layer 450 of appropriate resin which may be the same or different resin from the one applied to its first side by resin coater 38. After being passed through curing oven 46 the web may be edge trimmed and passed through rotary slitter 51 which cuts it into narrower strands 410, 411, 412 and 413, each one carton blank wide. The narrower strands 410–413, as they are cut, are tightly coiled into rolls indicated at 52, 53, 54 and 55. These rolls are then enclosed in a protective wrapper for shipping and storage until required to be set up into cartons.

It will be understood that not only can the two sequences of steps described with reference to FIGURES 3 and 4 be combined by omitting the steps of coiling the web into roll 40 and subsequently uncoiling it, but that the arrangement of steps can be varied and one or more of the steps can be omitted. For example, the perforating, printing and resin coating steps of FIGURE 5 can be completed prior to the sequence of steps comprising FIGURE 4. In this event the web after exiting from the curing oven 39 will be passed through the rotary slitter 51 and coiled into rolls 52–55. Again perforator 42 can be omitted from the processing line of FIGURE 5 and placed in the line of FIGURE 4 ahead of aluminum coater 34 so as to form perforations and other index means which will be useful in the steps of said line as well as in the apparatus of FIGURE 5. Also, the alminum coating apparatus 34 and dryer 35 can be omitted if it is desired to rely solely on a colorant or dye to inhibit the passage of ultraviolet radiations to the packaged products or if the carton forming material itself comprises aluminum foil. Also the color printer 36 may be omitted if it is desired to rely solely on the aluminum coating. The colorant may also be mixed with the resin coating solution applied at 38. Alternatively, it may be added to the resin coating applied by means 45. Also the metal coating and/or colorant may be applied to both sides of the paper stock. Conceivably, the resin coating may be applied to both sides of the web at station 38. In this event, resin coater 45 and curing oven 46 can be omitted and the web passed through the printer 43 before the other side of the web 33 is coated at 34. Also, the printing can be made on the resin coating. If web 33 itself comprises a thermoplastic resin sheet, then one or both resin coatings can be omitted. Preferably, however, a resin coating 380 will be applied even in this instance either to serve as a carrier for the colorant or to cover the same and also the aluminum metal layer 350.

Instead of relying on the thermoplastic character of the aplied resin coatings to obtain a bond between tab portions of flaps 250, 251, 252, 253 (FIGURE 14), a pressure sensitive adhesive can be applied over selected areas thereof to provide strands of carton blanks as illustrated in FIGURES 10 and 15. In this embodiment the protective resin coating can be either a thermosetting or a thermoplastic resin. Optionally and dependent on the characteristics of the selected adhesive, the metal coating, colorant layer and resin coating applicators can be adapted so as to leave bare those portions of the web on each side thereof to which the adhesive is applied. Referring therefore to FIGURE 7, after leaving the curing oven 46 and before passing through the rotary slitter 51, the wide web 41 will in this alternative continue through further rotary presses 47 and 49 which apply a pressure sensitive adhesive coating to the bottom and top sides of the said web, in those areas thereof which form the end flaps 250–253, tab 217 and margin 219 of the carton blanks. The adhesive preferably comprises a rubber latex of high solids content mixed with a small amount of appropriate dispersing agent and plasticizer, if desired. It is applied while in liquid form as a thin film and which is then dried as by passing through ovens 48 and 50 causing the liquid adhesive to congeal. One of the important characteristics of the adhesive used is that after it congeals, it will not stick to bare paper, but will instantly weld to itself on application of slight pressure, that is, it will only bond to other adhesive coated areas. One example of such an adhesive is that sold by Swift & Company, Chicago, Illinois, and identified by them as "Adhesive #3239." This adhesive is understood to comprise essentially a natural rubber latex 60% solids, and containing from 1 to 2% by weight of ammoniated casein, plus a dispersing agent. It has an approximate shelf-life of six months and is considered to be non-toxic. Any other adhesive possessing similar characteristics, however, may be used, and is considered to be within the scope of the present invention. Where two surfaces are to be joined together in this manner, it is necessary that both surfaces be precoated with the adhesive. Thus to produce the rectangular carton illustrated in FIGURE 1, it is required that selected areas of both sides of the ribbon be coated. Moreover since the adhesive coated carton blanks are recoiled into tight rolls for shipping and storage before being set up into complete cartons, it is essential that these adhesive areas be arranged in parallel lanes, the boundaries of which do not overlap. Were the lanes of adhesive on one side of the web permitted to overlap an adjacent lane of adhesive coated areas on the other side of the web, then at some point during recoiling of the web 41 it would be possible for adjacent turns of the coil to weld together and so that the strands of carton blanks could not be subsequently uncoiled. For this reason, referring to FIGURES 10 and 15, it will be seen that the adhesive applied to the bottom side of the web 41 or strands 410, 411, 412, 413 by adhesive applicator 47 (represented in dotted lines as comprising areas 471 on margin 219, and areas 472, 473 and 474 on the end flap forming portions 250 and 253) constitute lanes of adhesive patches paralleling the edge of the web. Each of the lanes is separate from and does not encroach within the boundaries of the adjacent lane of those adhesive areas applied by the applicator 49 to the opposite side of the sheet. The latter are represented by full lines and comprise areas 491, 492, 493 and 494 on each blank.

Although the adhesive may be applied simultaneously to both sides of the web 41, I have found it more desirable to apply the adhesive to each side in separate operations. Thus in FIGURE 7, the web 41 is illustrated as being passed through a first adhesive applicator at 47 which includes a tank 47a of liquid adhesive, a feeder roll 47b and an applicator roll 47c which is suitably contoured to supply the liquid adhesive to the underside of the strip in the required areas. The other side of the strip is then passed through the heated atmosphere of oven 48 which drives off the excessive vehicle in the adhesive. Desirably, at this stage the strip may be recoiled before going to the next operation, or one may proceed directly thereto as illustrated in FIGURE 7. The web 41 is then passed through the second adhesive applicator indicated at 49, which includes a similar tank 49a, feeder roll 49b and suitably contour faced roll 49c which applies adhesive to the opposite side thereof and in the proper lanes as described previously. The adhesive applied thereby is congealed in the heated atmosphere of chamber 50.

It has been found that printing and adhesive coating presses of the type referred to above may be operated in excess of 600 linear feet per minute which means that for pint size cartons, approximately nine hundred cartons can be produced per minute for each lane. Consequently, when printing a web of paper four cartons lanes wide one is able to produce 3600 cartons per minute or at the rate of 216,000 per hour. Obviously, also when printing multiple lanes, as many different customers' trade marks and other identifying legend may be printed simultaneously as there are lanes. This gives good manufacturing flexibility.

As seen in FIGURES 1 and 10, what is rolled and packaged for shipment to the dairies or other carton set-ups locations constitute in effect long strands of resin coated carton blanks joined together at their ends, and on which have been printed the required identifying legends as well as adhesive patches, if used, and indexing holes 420 but which possess an otherwise smooth surface and have substantially uniform uninterrupted parallel opposed side edges whereby the same may be conveniently coiled into tight rolls in order to occupy a minimum amount of shipping and/or storage space. It has been found that a single roll, such as illustrated in FIGURE 1, 36 inches in diameter with a 10 inch core, will contain 6700 one-pint size cartons. Because so many cartons can be compressed into such a small volume, it is apparent that the packaging cost will be extremely low and therefore the manufacturer can afford to wrap the rolls in moisture-proof, dirt-proof, and vermin-proof material, as described above, thus assuring the utmost in clean and sanitary delivery of carton blanks to the dairy.

These strands of carton blanks are thereafter completed at the dairy or other user by removing its wrapper 100 and mounting the roll at one end of a setup machine, as illustrated in FIGURES 11, 12 and 18 to 20, and feeding the unwound strand of carton blanks therethrough.

FIGURES 11 and 12 illustrate in diagrammatic form the sequence of steps and/or apparatus to which the strands of carton blanks are processed in the setup machines. Thus in FIGURES 11 and 12, reference numeral 410 represents one of the strands of carton blanks into which processed web 33 was previously divided (FIGURE 6), and which is fed from roll 52 by a motor driven rotary member 61 having spaced teeth 611 which cooperate with the indexing holes 420 so as to advance the strand one carton length (equal to one pitch distance between holes) for each machine cycle. Instead of a toothed feed roller any other suitable means such as a reciprocating feed bar 61' (FIGURE 16) might be utilized for this purpose.

If the strands had been previously marked at station 42 with light sensitive markings, rather than the described apparatus, then a photocell 61a might be used, as illustrated in FIGURE 17, to control the intermittent feed of the strand 410 through the succeeding stations, and additional impelling means, such as a pair of friction rollers 61e, 61f, will be relied upon to obtain movement of the strand 410 under control of the photocell. Thus, light from a source 61b might be directed by an optical system 61c onto a given spot, such that a marking 420 coming under the spot will affect light directed to the photocell which therefore acts as a switch in the electrical circuit of the solenoid control 61d for the roller 61e.

At the next station, reciprocating punch 62 serves to punch out areas represented by 621, 622, 623, 624 and 625 in FIGURE 14 or 15, and which constitute waste material surrounding the tuck-in flaps. These punched out areas also include the perforations 420 which are no longer required.

The strand 410 is then fed to the next station 63 where fold lines 214, 215, 216 and 218 between the side panels 210, 211, 212, 213 and side flap 217 are impressed in the sheet material. Also, simultaneously formed at this station are the fold lines indicated generally at 270 which are relied upon in closing the open end of the completed carton after filling to form the aforementioned gable top 28. Although conceivably these fold lines could be formed by the manufacturer in the sequence of steps illustrated in FIGURES 4–8, it would not be possible thereafter to coil the strands as tightly into a roll, and it has been found as convenient to conduct this step in the carton set-up machine immediately ahead of the actual folding, and thereby to permit packaging a greater number of carton blanks per cubic foot. The strand of carton blanks 410 then continues to a third station where cutter 64 forms slots 641, 642 and 643 between the flaps in order to permit later folding of the flaps 250–253 during the end closing operation. At which time the terminal carton blanks is also simultaneously severed along lines 644, 645 and 646 from the rest of the strand. The connecting fibers at 647 thereafter alone serve to hold the terminal blank to the strand and have been found sufficient to permit propelling the end carton blank to the two succeeding stations where the actual folding operation is accomplished.

At the first of these two folding stations, the terminal blank has its connected side panel 212 overlying rectangular mandrel 65 and its panel 210, 211 and 213 free. Folding wings 652 and 653 (FIGURES 18 and 19) engage panels 213 and tab 217 to wrap them around one side and the bottom side of the mandrel. Other folding wings 654 and 655 then engage side panels 211 and 210, wrapping them around the opposite side of the mandrel and so that the marginal portion 219 of panel 210 overlies the attachment tab 217 on the underside of the mandrel 65. Marginal portion 219 and attachment tab 217 are brought into contact with each other by the heat of the folders which push them together with light pressure. Their contacting plastic coated surfaces fuse to obtain a welded strong joint. In the case of the embodiment according to FIGURES 10 and 15, the contacting sides of margin 219 and tab 217 are provided with a pressure sensitive adhesive so that the union is also obtained by simple pressure. No heat is required and no machine time is lost waiting for the adhesive to set.

The carton, which now comprises a rectangular tube completely surrounding the mandrel, is next propelled along the mandrel by the succeeding intermittent movement of drive member 61 so as to locate the fold lines 220, 221, 222 and 223 between the end flaps and side panels in alignment with the end of the mandrel. The propelling movement of the now rectangular tube shaped carton blank may be aided by a supplementing feed bar 610, not shown, which will engage the trailing edge of the rectangular tube, as, for example, at 645. At this second folding station (FIGURES 19 and 20), a further folder 657 will engage flap 251, then folder 658 engages flap 253, folding them at right angles against the flat ends 651 of the mandrel 65. Another folder 659 then bends flap 252 at right angles across flaps 251 and 253. Following this, still another folder 670 bends flap 250 over the top three previously folded flaps. In one case folder 670 is heated so that it both applies heat and pressure on the four flaps sufficient to weld them into a strong bottom panel. In the case of polyethylene coated paper board the sealing temperature of the contacting interfaces is approximately 250° F. This can be conveniently realized if the operating temperature of the folder is maintained at approximately 450–500° F.

In the alternative arrangement (FIGURE 15), folder 670 need not be heated and pressure alone is relied upon to cause adhesive patch 474 on flap 253 to bond with the centrally located adhesive patch flap 251. Adhesive patch 473 on end flap 252 simultaneously is bonded with the overlapped portion of patch 492 on flap 253 and patch 472 bonds with adhesive patch 491 and flap 251. As flap 250 is folded into position, its adhesive patch 472 comes into contact with the remaining uncovered portions of adhesive patch 491 on flap 251 and adhesive patch 493 on flap 253 to complete the sealing of the end of the carton.

Simultaneously with the folding of the end flaps in either embodiment, a knife blade indicated at 661 (FIGURE 13) cooperating with a fixed blade (not shown) on the mandrel cuts the completely formed carton away from the strand along connecting fiber line 647 whereupon the carton is blown off the mandrel by air pressure through jets 17 in the end of the mandrel, and the semi-finished carton C is dropped onto a conveyor belt indicated generally at 68. The completed cartons indicated generally at C are thereupon conveyed to the filling station 70.

After the cartons have been filled, their top ends are closed as at 71 by folding along fold lines 270 in conventional manner and stapling or otherwise securing end flaps 29, 30 to produce the completed and filled carton illustrated in FIGURE 3. Provision may be also made for automatically loading the filled cartons into containers.

Although the cartons should be sufficiently liquid-tight, once the bottom end flaps have been secured together as above described, if desired, and/or in the case of "leakers," the cartons can be dipped into heated wax or more of the resin and to a limited height sufficient to complete the seal and/or to obtain any necessary further liquid proofing. Also, is desired, the plastic coating could be applied by the manufacturer only to the side of the web forming the interior of the carton and the outer side of the cartons can be wax coated at the dairy just prior to the filling step.

From the above description of preferred embodiments of the invention, it will therefore be seen that the entire operation, beginning with the rolls of processed paper stock provided the packager and continuing through the carton completing, filling and top closing may be accomplished as a continuous process and by a single machine working automatically and with a minimum of supervision.

Furthermore, in a convenient and entirely practical manner a manufacturer is able to provide long lengths of carton forming blanks in tightly coiled rolls which are complete in themselves for such an automatic carton set-up and filling machine and which cartons when set up will provide adequate protection to various products packaged therein, as well as preventing deterioration of the vitamins C and $B_2$ content of the packaged products, as when stored in fluorescent lighted refrigerated show cases or exposed to sunlight.

Thus from the aforesaid description, it will be apparent that all of the objects, features and advantages of the invention can be obtained, and the invention practiced in a convenient, simple, and practical manner.

Having described my invention, I claim:

1. The process of packaging fluids containing vitamins for shipment and storage under ultraviolet and fluorescent lighted conditions, which comprises surface coating at least one side of a length of sheet stock with a continuous coating of heat softenable non-toxic resin containing an ultraviolet deterring brown colorant, thereafter feeding one end of the coated stock onto a mandrel, folding said end about the mandrel and lapping selected portions thereof with other portions of the end to shape said end to the form of a carton having one end closed, applying heat to said lapped portions to soften the resin coating therebetween, then applying pressure to secure the lapped portions together, and only then severing the thus completed carton from the remainder of the length of stock, filling the carton through its open end and then closing said end to seal the fluid therein.

2. The process of claim 1 wherein the sheet stock is substantially of thermoplastic material.

3. The process of packaging fluids containing ascorbic acid for storage under fluorescent-lighted conditions, which comprises tinting at least one side of a length of sheet stock with a dark brown non-toxic colorant, coating the surfaces of said length of sheet stock with a non-toxic thermoplastic resin, then feeding one end about the mandrel and lapping selected portions thereof with other portions of the end to shape said end to the form of a carton having one end closed, applying heat to said lapped portions to soften the resin coating, then applying pressure and allowing to cool so as to secure the lapped portions together, and only then severing the thus completed carton from the remainder of the length of sheet stock, filling the carton through its open end and then closing said end to seal the fluid therein.

4. The process of packaging fluids containing ascorbic acid for storage under fluorescent-lighted conditions, which comprises surface coating at least one side of a length of sheet stock with a solution of light reflective metal, then applying a continuous layer of heat-softenable non-toxic resin over said light reflective metal coating, then feeding one end of the coated stock onto a mandrel, folding said end about the mandrel and lapping selected portions thereof with other portions of the end to shape said end to the form of a carton having one end closed, applying heat to said lapped portions to soften the resin coating, then applying pressure to secure the lapped portions together, severing the thus completed carton from the remainder of the length of sheet stock, filling the carton through its open end and then closing said end to seal the fluid therein.

5. The process of manufacturing cartons for packaging fluids containing ascorbic acid and other vitamins and nutrients deleteriously affected by storage under fluorescent and ultraviolet light, which comprises surface-coating at least one side of a length of carton stock with a material which inhibits passage of radiations from said light which deleteriously affect said fluids, said material being selected from the group consisting of aluminum, dark red and brown colorants, and coating both sides of the carton stock with a heat softenable non-toxic resin, feeding one end of the coated stock onto a mandrel, folding said end about the mandrel and lapping selected portions thereof to shape said end to the form of a carton having one end closed, then applying heat and pressure sufficient to secure the lapped portions together, and severing the thus completed carton from the remainder of the length of carton stock.

6. The process of manufacturing cartons for packaging fluids containing vitamins, which comprises surface coating at least one side of a length of carton material stock with a heat-softenable non-toxic resin containing a dark red colorant which inhibits the passage of light radiations which detrimentally affect the vitamin content of the fluid to be packaged, feeding one end of the coated stock onto a mandrel, folding said end about the mandrel and lapping selected portions thereof with other portions of the end to shape said end to the form of a carton having one end closed, then applying pressure to secure the lapped portions together, and severing the thus completed carton from the remainder of the length of sheet stock.

7. The process of manufacturing cartons for packaging fluids containing ascorbic acid, which comprises solution depositing a continuous layer of light reflective metal particles over at least one side of a length of carton stock, covering the thus deposited layer of light reflective metal particles with a protective coating of heat softenable non-toxic resin, thereafter feeding one end of the coated stock onto a mandrel, folding said end about the mandrel and lapping selected portions thereof with other portions of the end to shape said end to the form of a carton having one end closed, applying heat to said lapped portions to soften the coating, then applying pressure to secure the lapped portions together, and severing the thus completed carton from the remainder of the length of carton stock.

8. The process of manufacturing cartons for packaging fluids containing light-sensitive vitamins and nutrients, which comprises solution depositing a layer of aluminum metal particles over at least one side of a length of carton-forming stock, covering said layer of aluminum metal particles with a protective coating of heat softenable non-toxic resin containing a dark brown colorant, thereafter feeding one end of the coated stock onto a mandrel, folding said end about the mandrel and lapping selected portions thereof with other portions of the end to shape said end to the form of a carton having one end closed, applying heat to said lapped portions to soften the coating, then applying pressure to secure the lapped portions together, and severing the thus completed carton from the remainder of the length of stock.

9. The process of manufacturing cartons for packaging fluids containing ascorbic acid, which comprises solution depositing a layer of aluminum metal particles over at least one side of a length of carton stock, covering both sides of said stock including said layer of aluminum metal particles with a protective coating of heat softenable non-toxic resin, thereafter feeding one end of the coated stock onto a mandrel, folding said end about the mandrel and lapping selected portions thereof with other portions of the end to shape said end to the form of a carton having one end closed, applying heat to said lapped portions to soften the coating, then applying pressure to secure the lapped portions together, and severing the thus completed carton from the remainder of the length of stock.

10. The process of manufacturing cartons from lengths of sheet stock, which comprises coating the total area of at least one side of said sheet stock with a heat softenable non-toxic resin, applying index means to said sheet stock at regular intervals along their length to indicate those portions thereof which constitute carton forming blanks, thereafter coiling the resin coated and indexed length of sheet stock into tight rolls, and when ready to be formed into cartons, uncoiling said rolls of coated sheet stock, scoring the sheet stock at regular intervals related to said index means to define fold lines in each carton forming blank along which the sheet stock may be folded into the form of a carton having a closed end by lapping preselected portions thereof, partially severing the end blank from said length, folding it to the form of a carton having one end closed by lapping said preselected portions, applying heat to said lapped portions so as to soften the resin coating thereof and applying pressure to bond the lapped portions to each other and then severing the thus completed carton from the remaining length of sheet stock.

11. The process of manufacturing cartons form a length of sheet stock, which comprises coating both the surfaces of said sheet stock with a continuous layer of heat softenable non-toxic resin, applying index means to said sheet stock at regular intervals along its length to indicate those portions thereof which constitute carton forming blanks, thereafter coiling the resin coated and indexed length of sheet stock into tight rolls for shipment to a packing station, and when ready to be formed into cartons, there unrolling said rolls of coated sheet stock, scoring the sheet stock at regular intervals related to said index means to define fold lines in each said carton forming blanks along which the sheet stock may be folded into the form of a carton having a closed end by lapping preselected portions thereof, partially severing the end blank from said length, folding it along said score lines to the form of a carton having one end closed by lapping said preselected portions, applying heat to said lapped portions so as to soften the plastic coating and applying pressure to bond the lapped portions to each other and then severing the thus completed carton from the remaining length of sheet stock.

12. The process of claim 11 wherein after coiling, the tight roll of resin coated and indexed length of sheet stock is sheathed in a vermin-proof protective wrapper for shipping to the packaging station and for storage until needed.

13. The proces of manufacturing cartons from lengths of sheet stock, which comprises coating said sheet stock with a continuous layer of heat softenable non-toxic resin and an inhibitor to light radiations which will detrimentally affect the vitamin content of liquids stored in the cartons, said inhibitor being selected from the group consitsing of aluminum, dark red and brown colorants, applying index means to said sheet stock at regular inervals along their length to indicate those portions thereof which constitute carton forming blanks, thereafter coiling the coated and indexed length of sheet stock into tight rolls, and when ready to be formed into cartons, unrolling said rolls of coated sheet stock, scoring the sheet stock at regular intervals related to said index means to define fold lines of each carton forming blank along which the sheet stock may be folded into the form of a carton having a closed end by lapping preselected portions thereof, partially severeing the end blank from said length so scored from the length, folding it to the form of a carton having one end closed by lapping said preselected portions, applying heat to said lapped portions so as to soften the resin coating thereof and applying pressure to bond the lapped portions to each other and then severing the thus completed carton from the remaining length of sheet stock.

14. The process of manufacturing cartons from lengths of sheet stock, which comprises coating one side of said sheet stock with aluminum paint, covering the same with a continuous layer of heat softenable non-toxic resin, applying index means to said sheet stock at regular intervals along their length to indicate those portions thereof which constitute carton forming blanks, thereafter coiling the plastic coated and indexed length of sheet stock into tight rolls, and when ready to be formed into cartons, unrolling said rolls of coated sheet stock, scoring the sheet stock at regular intervals related to said index means to define fold lines in each carton forming blank along which the sheet stock may be folded into the form of a carton having a closed end by lapping preselected portions thereof, partially severing the end blank from said length, folding it to the form of a carton with said coating on its inside and having one end closed by lapping said preselected portions, applying heat to said lapped portions so as to soften the resin thereon and applying pressure to bond the lapped portions to each other by means of said softened resin and then severing the thus completed carton from the remaining length of sheet stock.

15. The process of manufacturing cartons, which comprises unrolling a strand of carton blanks having a heat softenable surface comprising at least one side thereof, partially severing the end one of said blanks from the strand, folding it about a mandrel, lapping selected portions thereof with other portions of the end blank to shape said blank to the form of a carton having one end closed, applying heat to said lapped portions to soften the contacting surfaces, then applying pressure to secure the lapped portions together, and severing the thus completed carton from the remainder of the strand.

16. The process of manufacturing cartons, which comprises unrolling a strand of carton blanks having a heat softenable non-toxic plastic coating covering at least one side thereof, partially severing the end one of said blanks from the strand, folding it about a mandrel with the plastic coating on the side toward the mandrel, lapping selected portions thereof with other portions of the end blank to shape said blank to the form of a carton having one end closed, applying heat to said lapped portions to soften the plastic coating, then applying pressure to secure the lapped portions together by means of said plastic coating, and severing the thus completed carton from the remainder of the strand.

17. The process of manufacturing cartons, which comprises unrolling a coil of paper stock having a heat softenable non-toxic plastic coating covering at least one side thereof, scoring said coated paper stock at regular intervals considered lengthwise of the uncoiled paper stock to define a repetition of blanks each having lines along which the stock may be folded with overlapping portions to define a carton having one end closed, aligning the end blank of said length of paper stock thus scored onto a mandrel with its coated side to the mandrel, partially severing the thus aligned blank from the remainder of the paper stock, folding said end blank about the mandrel while lapping selected portions thereof with other portions of the end blank to shape said blank to the form of a carton having one end closed, applying heat only to said lapped portions to soften the plastic coating therebetween, then applying pressure to secure the lapped portions together by means of said softened plastic, and severing the thus completed carton from the remainder of the strand.

18. The process of manufacturing cartons from long lengths of sheet stock comprising coating the sheet stock with a continuous layer comprising ultraviolet radiation inhibiting material selected from the group consisting of aluminum, dark red and brown colorants and an inert liquid-proofing non-toxic resin material, applying index means to said sheet stock at regular intervals along the length thereof to indicate those portions thereof which constitute carton forming blanks, thereafter applying adhesive to said sheet stock in pre-selected non-contiguous patches arranged in parallel lanes extending lengthwise of the sheet stock and at intervals in each lane determined by the spacing of the index means so as to be applied only to those areas of the sheet stock which are to be joined to other areas thereof when the portions constituting blanks are folded and severed from the sheet stock to form cartons, thereafter coiling the thus adhesive-coated sheet stock into tight rolls, and when ready to be joined into cartons, unrolling said rolls of adhesive and resin coated sheet stock and joining the adhesive patch bearing areas of each of its carton forming blank portions with other areas thereof by folding and severing said portions from the sheet stock along lines related to said index means so as to fall between the non-contiguous patches of adhesive.

19. The process of manufacturing cartons, which comprises unrolling a strand of carton blanks having a relatively inert, non-toxic, water resistant plastic surface on at least one side thereof and pre-adhesive coated portions which are to be lapped with other portions, partially severing the end one of said blanks from the strand, folding it about a mandrel, lapping said pre-adhesive coated portions thereof with other portions of the end blank to shape said blank to the form of a carton having one end closed, then applying pressure to secure the lapped portions together and severing the thus completed carton from the remainder of the strand.

20. The process of packaging fluids containing ascorbic acid for storage under fluorescent-lighted conditions, which comprises surface coating at least one side of a length of paper stock with a solution of light reflective metal, tinting said metal with a dark red colorant which absorbs ultraviolet radiations, applying a layer of protective non-toxic resin over said tinted reflective metal coating, curing said resin layer, thereafter feeding one end of the coated stock onto a mandrel, folding said end about the mandrel and lapping selected portions thereof with other portions of the end to shape said end to the form of a carton having one end closed, applying heat to said lapped portions to soften the resin coating therebetween, then applying pressure to secure the softened coating of the lapped portions together, severing the thus completed carton from the remainder of the length of paper stock, filling the carton through its open end and then closing said end to seal the fluid therein.

21. The process of manufacturing cartons for packaging fluids containing a light destructible material, which comprises coating at least one side of a length of sheet stock with a heat softenable non-toxic resin which will inhibit the passage of light radiations, and rolling the resin-coated sheet stock into a tight coil, thereafter unrolling the coiled stock and feeding one end thereof onto a mandrel, folding the end of the coated sheet stock about the mandrel, lapping selected portions thereof to shape said end into the form of a container and close the outer end thereof, applying heat to the lapped portions to soften the coating, then applying pressure to secure the lapped portions together, and severing the thus completed container from the remainder of the length of sheet stock.

22. The process of manufacturing cartons which comprises unrolling a strand of end-to-end-jointed flat carton blanks of non-toxic synthetic resin each having predesignated portions which are to be lapped with other portions of said carton blank, partially severing the end one of said blanks to permit folding it to the form of a carton and so that said predesignated portions lap, folding the blank into the form of a carton, effecting a liquid-tight bond between said lapped portions along the extent thereof, and then completing the separation of the carton from said unrolled strand.

23. A process of packaging fluids which comprises the steps of unrolling a strand of end-to-end-joined flat carton blanks having a non-toxic synthetic resin surface including portions which are to be lapped with other portions of the carton blank, partially severing the end one of said blanks to permit folding it to the form of a carton having one end closed and so that said portions lap, folding the blank into the form of a carton, effecting a liquid-tight bond between said lapped portions along the extent thereof, completing the separation of the formed carton from said unrolled strand, filling the formed carton through its open end, and thereafter closing the open end of the filled carton.

References Cited by the Examiner

UNITED STATES PATENTS

| | | | |
|---|---|---|---|
| 2,174,514 | 10/1939 | Hothersall | 53—29 X |
| 2,341,379 | 2/1944 | Householder et al. | 99—181.5 |
| 2,345,583 | 4/1944 | Chaney | 99—181.5 |
| 2,367,520 | 1/1945 | Patek | 229—3.1 |
| 2,414,540 | 1/1947 | Lum | 229—3.1 |
| 2,498,197 | 2/1950 | Baxter | 53—14 X |
| 2,576,542 | 11/1951 | Schoen | 53—29 |
| 2,708,544 | 5/1955 | Norman | 229—3.1 |
| 2,769,290 | 11/1956 | Harriman | 53—29 |
| 2,864,213 | 12/1958 | Carter | 53—29 |
| 2,865,550 | 12/1958 | Bergstein | 93—36 X |
| 2,977,729 | 4/1961 | Frechtmann et al. | 53—29 |
| 3,055,152 | 9/1962 | Williams | 53—29 |

A. LOUIS MONACELL, *Primary Examiner.*

EARLE J. DRUMMOND, JAMES R. GARRETT, RAYMOND N. JONES, *Examiners.*